(12) United States Patent
Luczycki et al.

(10) Patent No.: US 6,523,069 B1
(45) Date of Patent: Feb. 18, 2003

(54) TRANSMISSION OF MULTICAST MEDIA BETWEEN NETWORKS

(75) Inventors: Edward A. Luczycki, Plano, TX (US); Darin D. Divinia, Greenville, TX (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 09/524,319

(22) Filed: Mar. 13, 2000

(51) Int. Cl.$^7$ .............................................. G06F 13/00
(52) U.S. Cl. ...................................................... 709/249
(58) Field of Search ................................ 709/200, 213, 709/217, 218, 220, 223, 227, 231, 249, 250; 713/163, 155

(56) References Cited

U.S. PATENT DOCUMENTS 5,748,736 A    5/1998   Mittra ........................... 380/21

OTHER PUBLICATIONS

"Frequently asked Question (FAQ) on the Multicast Backbone (MBONE)," web pages located at www.cs.columbia.edu/~hgs/internet/mbone–faq.html, 11 pages, May 28, 1999.

V. Johnson et al., "Higher Level Protocols used with IP Multicast: an IP Multicast Initiative White Paper," web pages located at www.ipmulticast.com/community/whitepapers/highprot.html, 10 pages, May 28, 1999.

M. Macedonia et al., "MBone Provides Audio and Video Across the Internet," web pages located at taurus.cs.nps.navy.mil/pub/mbmg/mbone.html, 10 pages, May 28, 1999.

"RTSP frequently asked questions," web pages located at www.real.com/devzone/library/fireprot/rtsp/faq.html, 5 pages, May 28, 1999.

"The internet multicast backbone," web pages, located at www.serpentine.com, 10 pages, Feb. 19, 1996.

"IP Multicast Backgrounder: an IP Multicast Initative White Paper," Stardust Technologies, Inc., pp. 1–8, Copyright 1995–1997.

"Introduction to IP Multicast Routing," an IP Multicast Initiative White Paper, Stardust Technologies, Inc., pp. 1–12, Copyright 1995–1997.

"The evolution of multicast; From the MBone to Inter–Domain Multicast to Internet2 Deployment," Stardust.com, Inc., pp. 2–26, Dec. 6, 1999.

"How PointCast Works," web pages located at www.pointcast.com/products/pcn/hwork.html?pcnidx, 3 pages May 26, 1999.

"World Com," web pages located at www.mae.net/doc/maedesc/maedescl.html, 8 pages, May 12, 1999.

*Primary Examiner*—Robin B. Harrell
(74) *Attorney, Agent, or Firm*—Fish & Richardson P.C.

(57) ABSTRACT

A multicast media system includes a network access facility that directly interconnects a second multicast-enabled network to a first multicast-enabled network. The network access facility is configured to pass a requested multicast data stream from the first multicast-enabled network to a terminal in the second multicast-enabled network that request receipt of the multicast data stream. The direct peering of multicast media can be scaled to accommodate large numbers of users.

29 Claims, 8 Drawing Sheets

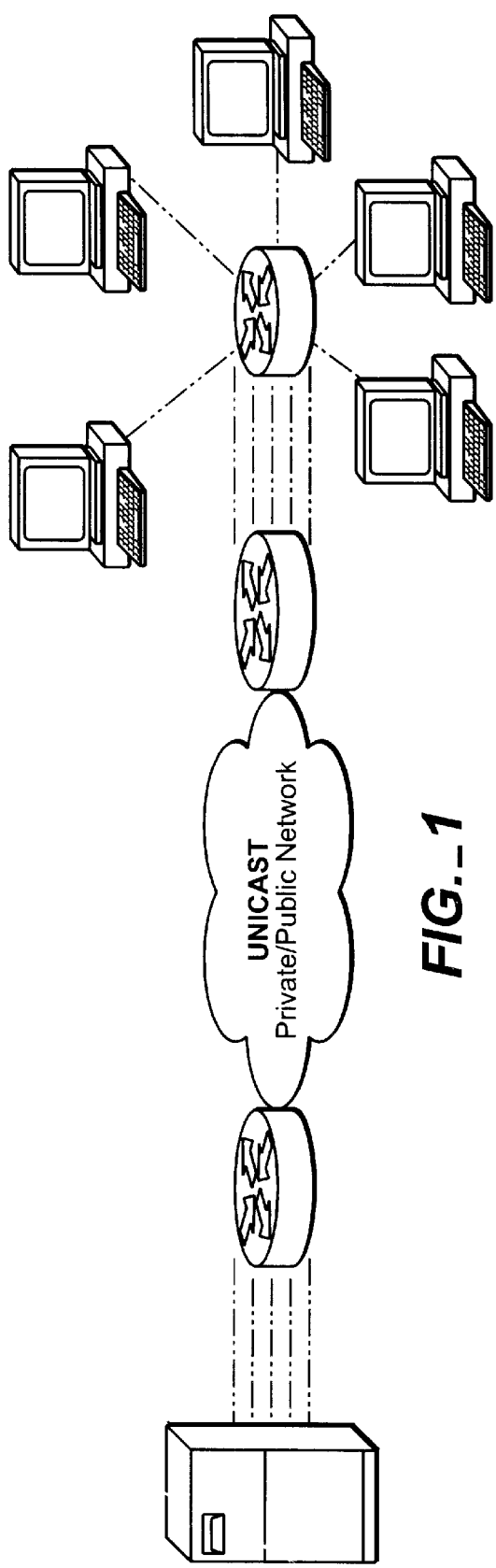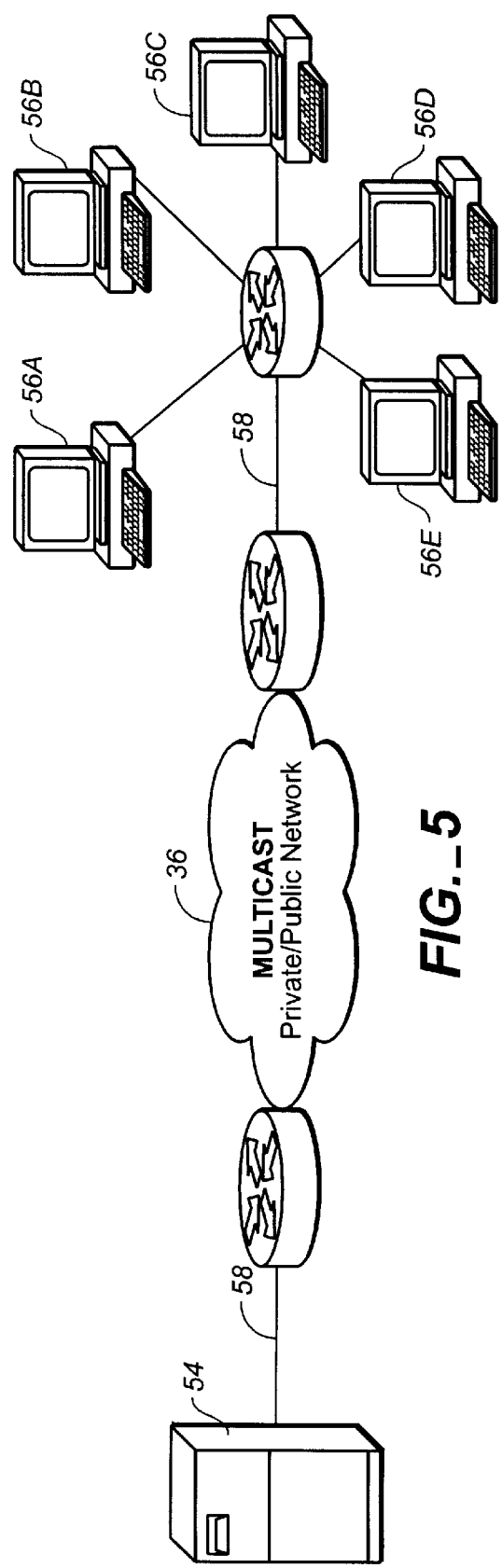

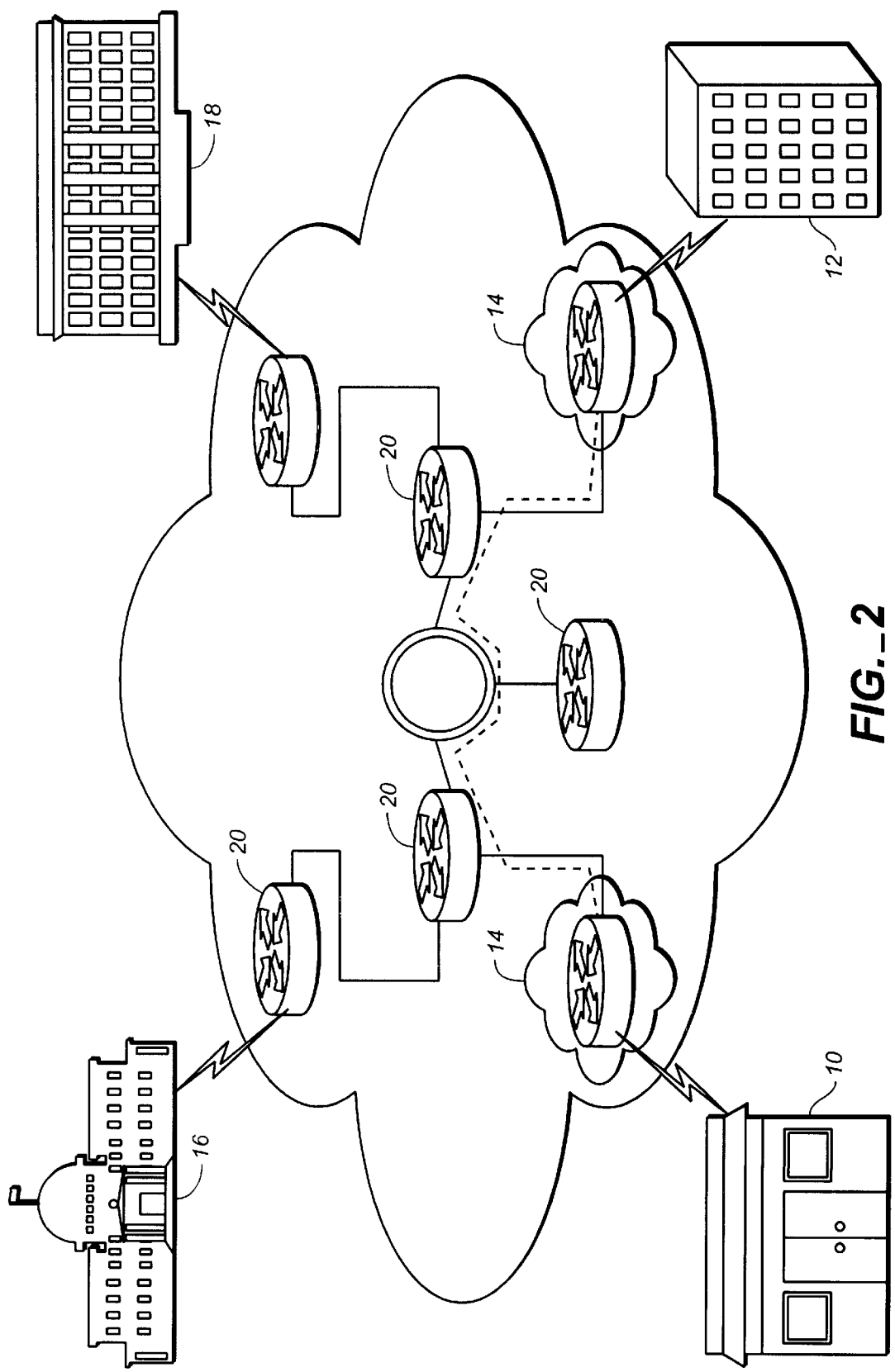
FIG._2

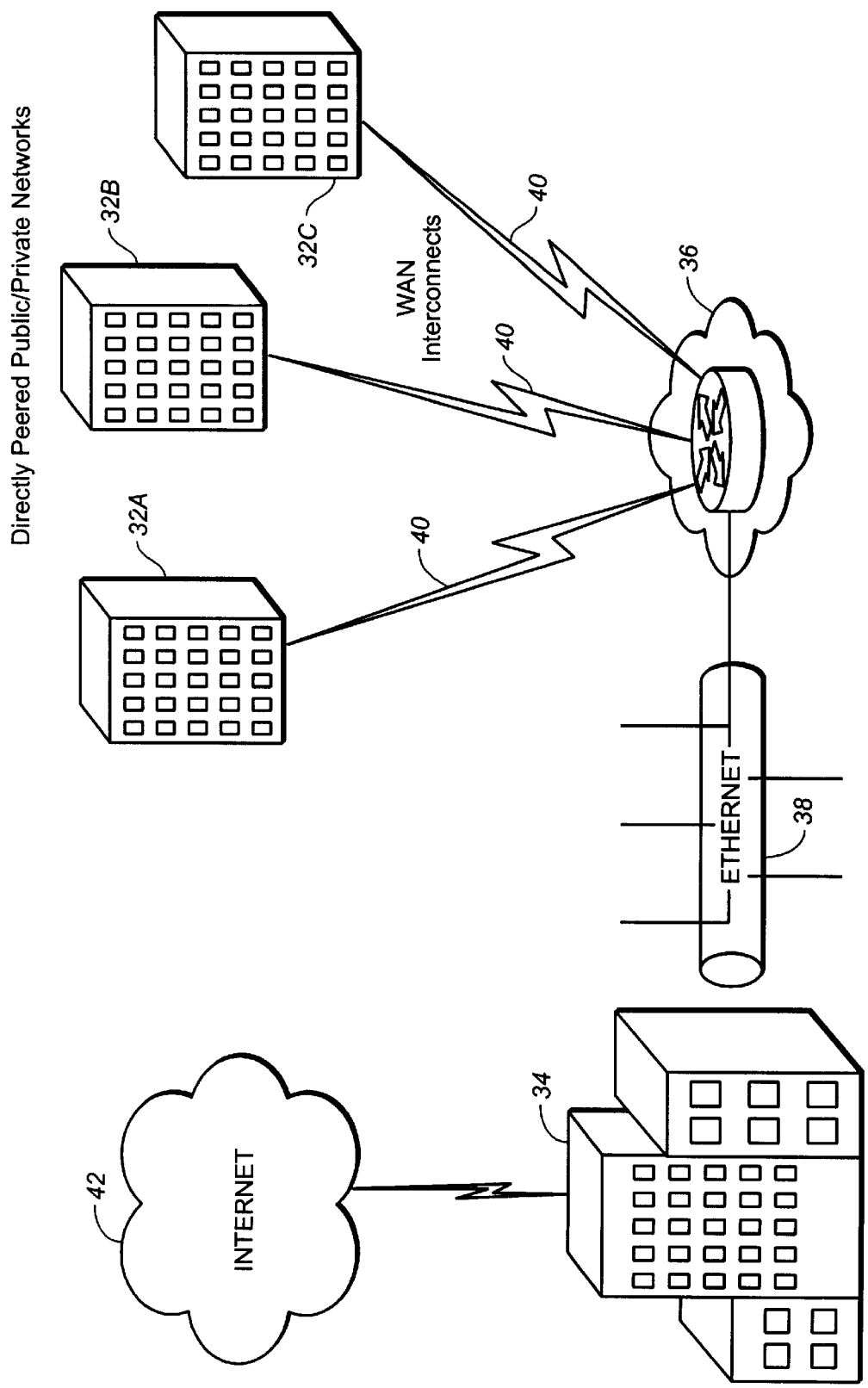
FIG._3

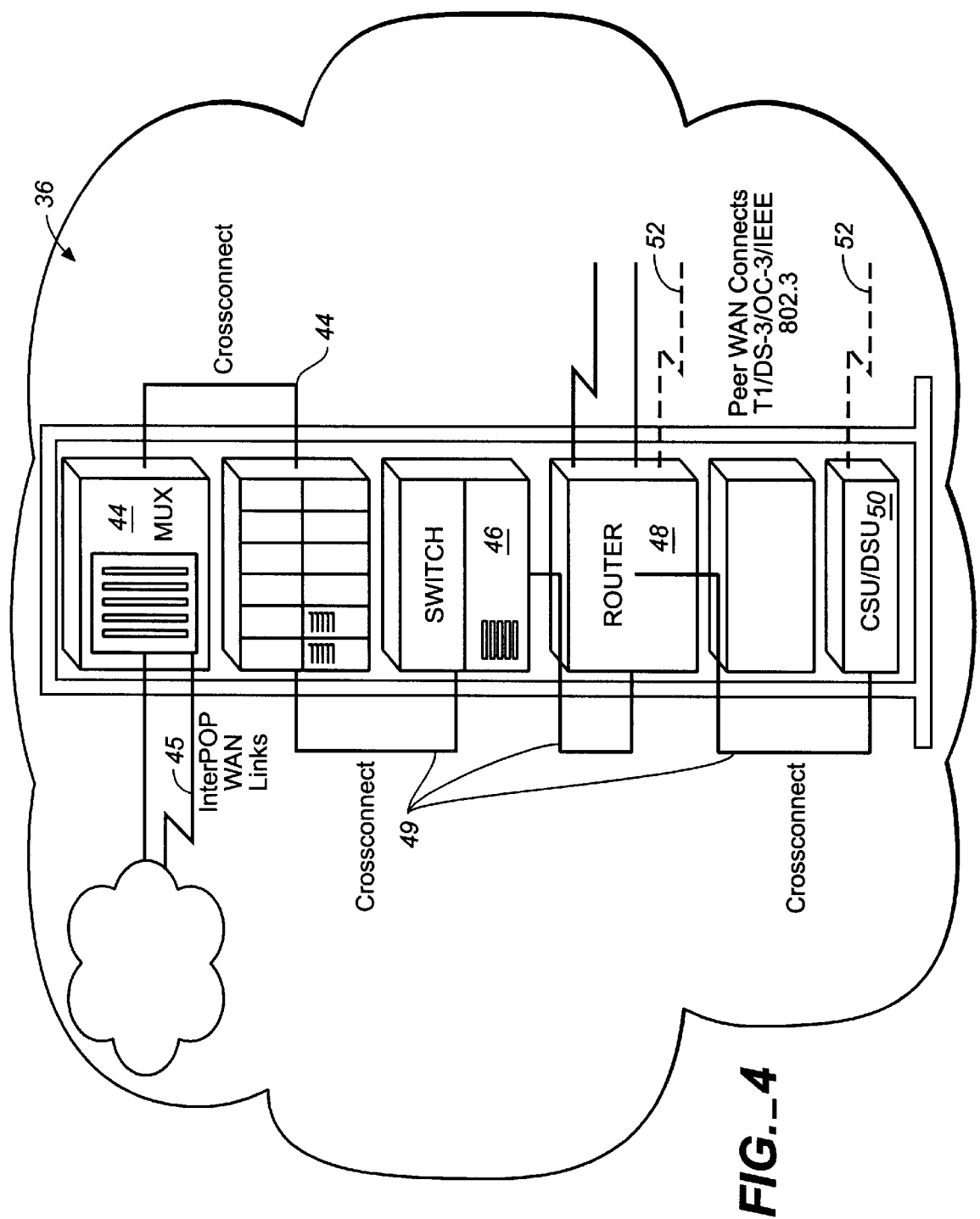
FIG._4

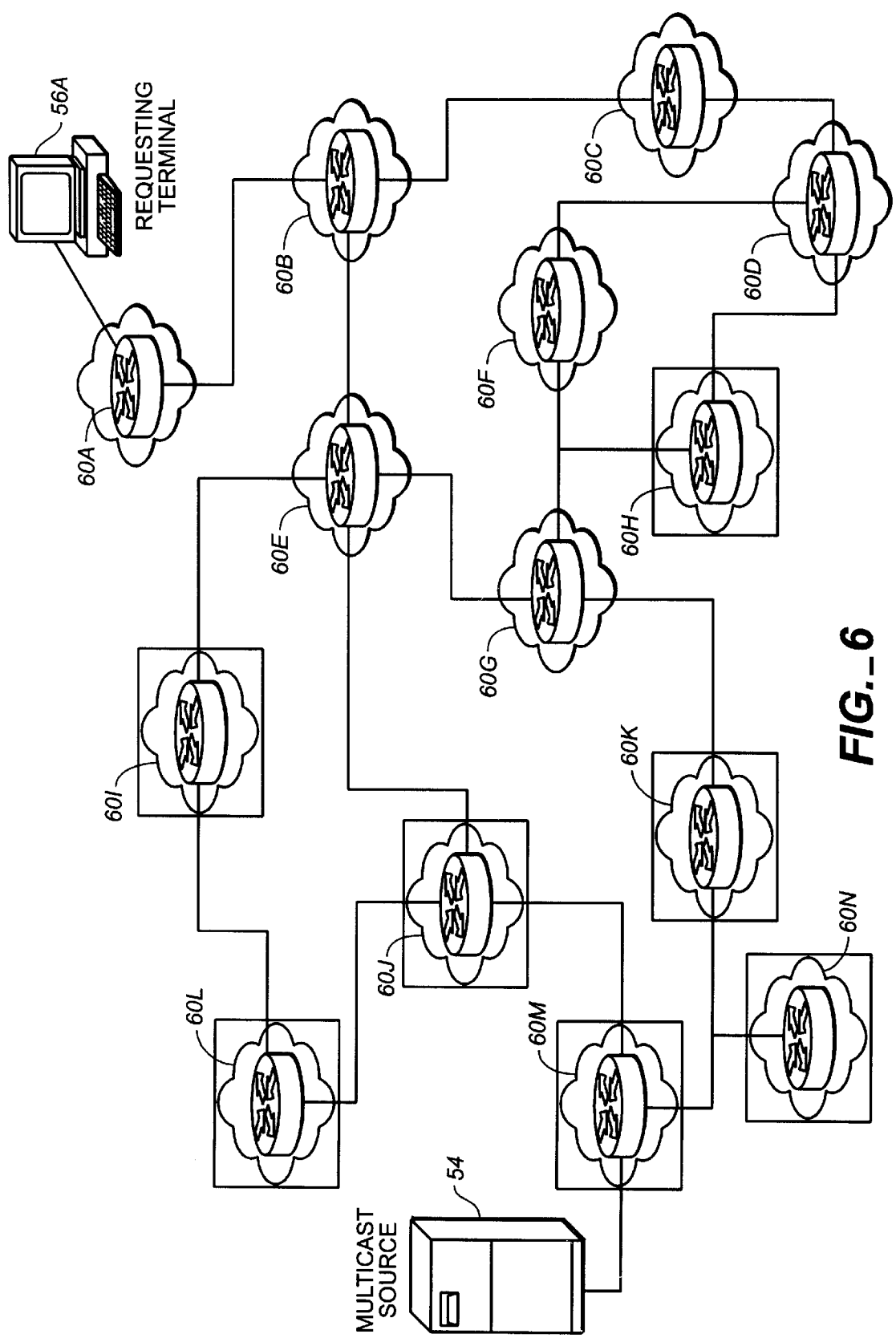
FIG._6

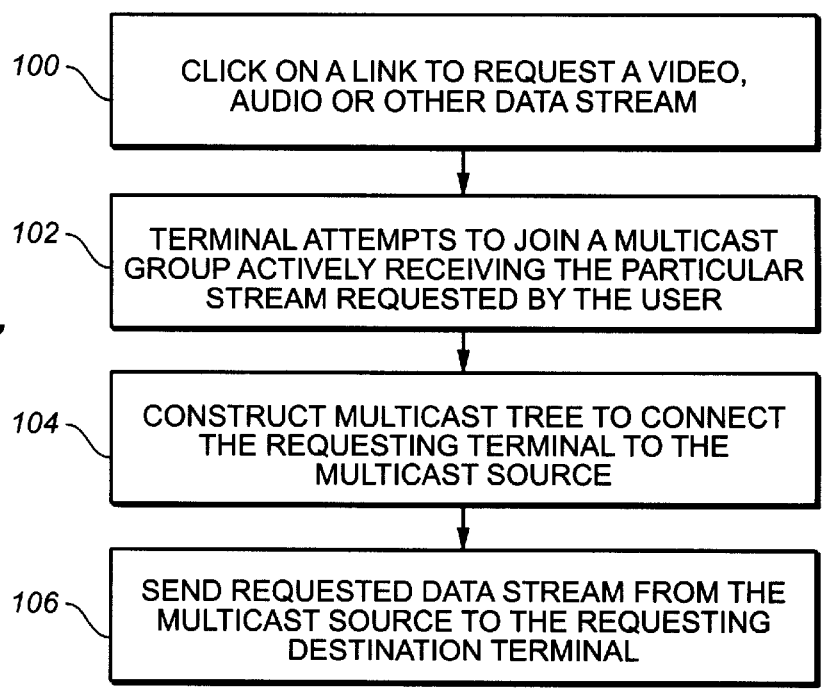
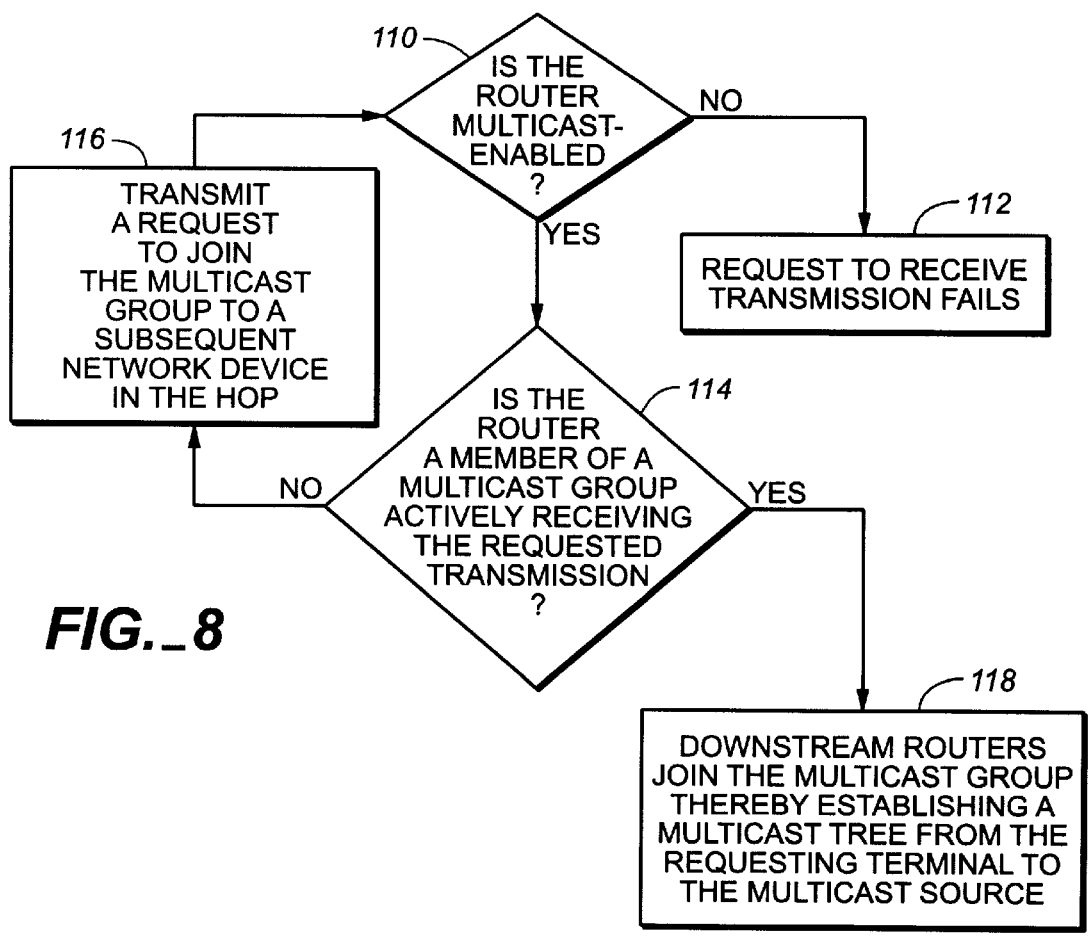

FIG._9A

```
Basic Router Configuration:
CISCO IOS (dense mode multicast)

config t
!
ip multicast routing
!
int ethernet0
ip pim dense-mode
!
int ethernet1
ip pim dense-mode
!

end
```

FIG._9B

```
Basic Router Configuration:
CISCO IOS (sparse mode multicast)

config t
!
ip multicast routing
ip pim rp-address X.X.X.X (supply IP address of RP)
!
int ethernet0
ip pim sparse-mode
!
int ethernet1
ip pim sparse-mode
!

end
```

FIG._10

```
Basic Switch Example:
Cisco Catylist 5000 IOS

! To enable Cisco's proprietary CGMP
set cgmp enable
!
! To enable IGMP snooping
set igmp enable IGMP and CGMP are mutually exclusive.
```

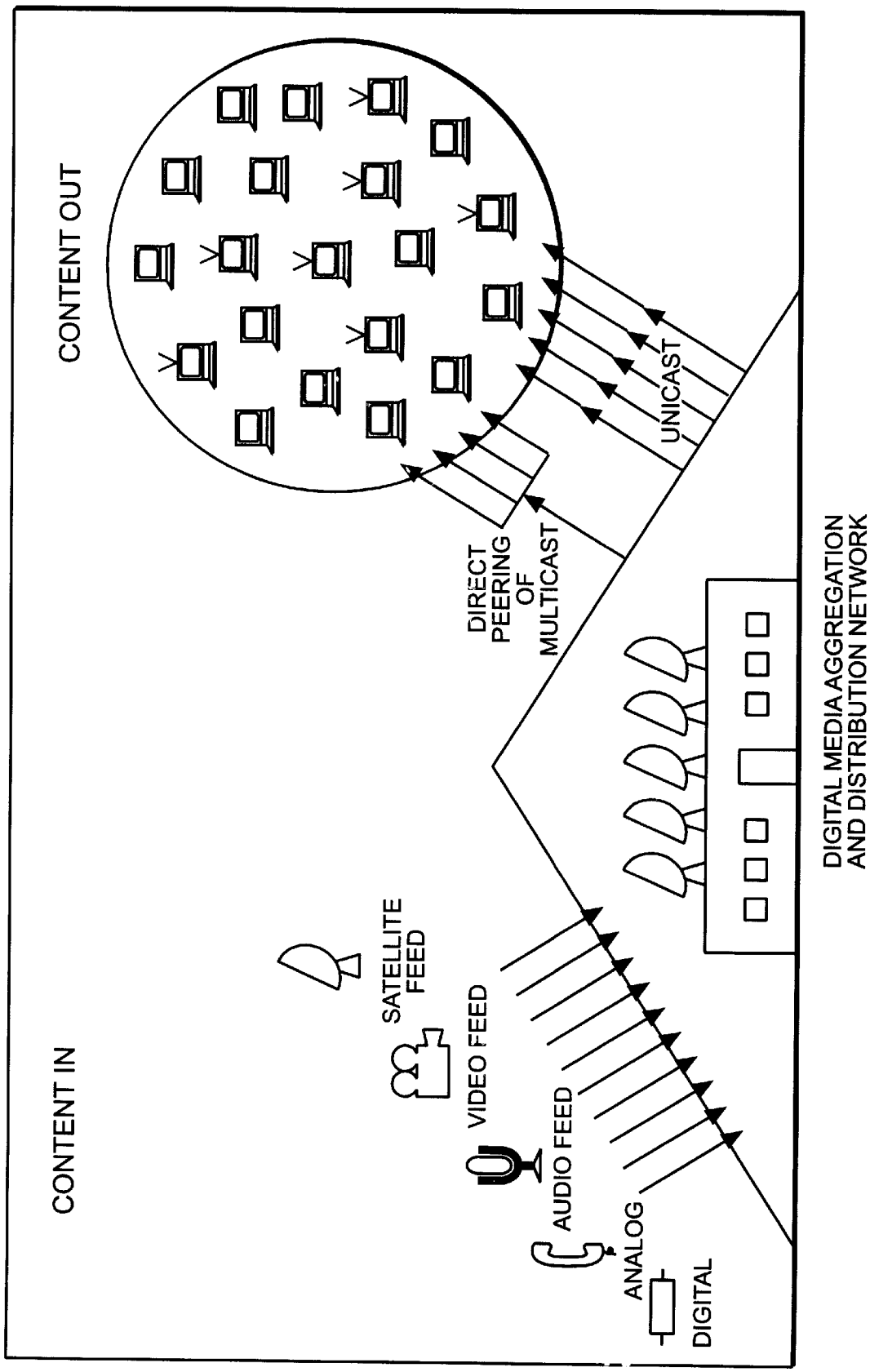
FIG._11

TRANSMISSION OF MULTICAST MEDIA BETWEEN NETWORKS

BACKGROUND

The invention relates generally to the transmission of multicast media between networks.

Extensive technological advances in microelectronics and digital computing systems have enabled digitization of a wide range of types of information, including digital representations of text, graphics, still images, as well as audio and video.

Additionally, as use of networks such as the Internet has proliferated, the desire to be able to transfer multimedia presentations over the Internet has increased. It also is desirable to accommodate multimedia data streams such as audio, video and animation, as well as other types of continuous, time-based media data. In this context, a "stream" represents a dynamic data type and includes dynamic information that is produced and consumed in a computer system or network with temporal predictability. Examples of such uses of multimedia include real-time interactive applications, such as desktop video and audio conferencing, collaborative engineering, shared white boards, transmission of university lectures, and many others.

Unfortunately, the Hypertext Transfer Protocol (HTTP) that is used for transferring web pages over the Internet is not well-suited for use in multimedia presentations of stream data because it is based on the Transmission Control Protocol (TCP). Among other features, TCP enforces reliability without regard for time-lines.

A multicast transmission, in contrast to a unicast transmission, is one in which information is transmitted to a group of recipients by a single transmission from a source. Multicast transmissions are often desirable because they are routed only to destinations that are actively interested in the particular multicast service. Unlike unicast transmissions (see FIG. 1), a multicast transmission does not require a separate dedicated feed for each user that requests the data stream. Similarly, unlike broadcast transmissions, multicast transmissions do not require all recipient hosts to perform some processing to determine whether or not they are interested in the transmitted data.

The Real-Time Streaming Protocol (RTSP), a client-server multimedia presentation protocol, was developed to address the needs for efficient delivery of streamed multimedia over Internet Protocol (IP) networks. The RTSP makes use of existing web infrastructures and controls on-demand delivery of data, such as audio and video, having real-time properties.

Although the Internet as a whole is not multicast-enabled, multicast-enabled subnet islands have been connected together to form the Multicast Backbone (Mbone), a virtual network layered on the physical Internet to support routing of IP multicast packets. In a virtual network, tunnels encapsulate IP multicast packets within the TCP and send them point-to-point to the end of the tunnel where the multicast packet is de-encapsulated. Thus, tunneling of multicast packets through the Internet can be used to extend public or private multicast networks.

For example, Internet tunneling can be used to tie together multicast-enabled networks. In FIG. 2, networks 10, 12 are connected to multicast-enabled routers 14. Other networks 16, 18 and the remaining routers 20 in the system are not multicast-enabled. To allow multicast transmissions between the networks 10, 12, a virtual network (indicated by the dotted lines in FIG. 2) layered on the physical network is provided to support routing of IP multicast packets.

The present inventors have recognized that the Mbone has a number of limitations, particularly with respect to its ability to deliver streaming data to mass audiences. The tools and protocols used by the Mbone inherently limit that network's ability to scale to large numbers of users and networks. Therefore, the Mbone had not been able to take advantage of the high bandwidth capacity of networks like the Internet.

SUMMARY

In general, according to one aspect, a multicast media system includes a network access facility that directly peers a second multicast-enabled network to a first multicast-enabled network. The network access facility is configured to multicast a requested time-based data stream from the first multicast-enabled network to a terminal in the second multicast-enabled network that requests receipt of the multicast data stream.

According to another aspect, a multicast media system includes a first multicast-enabled network including a source of time-based data streams, and a second multicast-enabled network including at least one terminal that can request receipt of a time-based data stream. The system further includes a network access facility that directly peers the second multicast-enabled network to the first multicast-enabled network, and which is configured to multicast a requested time-based data stream from the first multicast-enabled network to at least one terminal in the second multicast-enabled network that requests receipt of the data stream.

Various implementations of the multicast system include one or more of the following features. The network access facility can be configured to construct a tree of multicast-enabled gateways to establish a path over which the requested data stream will be sent to the terminal in the second multicast-enabled network. The network access facility can be configured to construct the multicast tree in response to a request by a user at the terminal to receive the data stream. In some implementations, the network access facility is configured to construct the multicast tree by starting from a gateway at an upstream end of the path near the terminal and moving toward the second multicast-enabled network. The network access facility can include multiple gateways that collectively form the multicast tree. During construction of the multicast tree, at least some of the gateways may attempt to join a group of gateways already actively receiving the requested data stream. The gateways can include, for example, routers and/or switches.

The first multicast-enabled network can be a multimedia aggregation and distribution network. In various implementations, the requested time-based data stream can include video, audio, or other data stream types.

According to another aspect, a method of providing a time-based media transmission from a first multicast-enabled network to a second multicast-enabled network includes establishing a multicast-enabled network access facility between the first and second multicast networks. The network access facility provides direct peering between the first and second multicast-enabled networks, and is configured to multicast a requested time-based data stream from the first multicast-enabled network to a terminal in the second multicast-enabled network that requests receipt of the data stream.

In yet another aspect, a method of delivering a time-based data stream includes establishing a multicast tree using multiple multicast-enabled gateways from a first multicast-enabled network serving as a source of time-based streaming data to a terminal in a directly peered second multicast-enabled network. The streaming data is multicast to the terminal in the directly peered second multicast-enabled network via the tree of multicast-enabled gateways.

In some implementations, the method includes receiving a request for receipt of the time-based data stream from the terminal in the second multicast-enabled network. The multicast tree can be constructed in response to the request to receive the data stream. The method can include sending a request from one multicast-enabled gateway to another multicast-enabled gateway to join a group of gateways already actively receiving the requested multicast data stream.

Various embodiments may include one or more of the following advantages. The digital media aggregation and distribution network and network access facility described above are designed to deliver streaming data to mass audiences. Unlike the Multicast Backbone which uses a virtual network layered on the Internet to support routing of IP multicast packets, systems and techniques described here provide a physical multicast-enabled network access facility that permits the distribution of multicast media across separate, independent networks. Such direct peering of multicast media can be scaled more easily to accommodate large numbers of users.

Other features and advantages will be readily apparent from the following detailed description, the accompanying drawings, and the claims.

BRIEF DESCRIPTION OF THE DRAWINGS

FIG. 1 illustrates a unicast transmission in which each destination requires a separate transmission of the data stream.

FIG. 2 illustrates the use of tunneling with a virtual network layered on a non-multicast-enabled network to support routing of IP multicast packets.

FIG. 3 illustrates a system that allows multicast media transmissions to be provided.

FIG. 4 illustrates various hardware components of an exemplary network access facility.

FIG. 5 illustrates a multicast transmission.

FIG. 6 illustrates a network of multicast-enabled routers some of which are members of an existing multicast group.

FIG. 7 is a flow chart showing how a multicast data stream is provided from a multicast source to the user of a computer terminal located in a directly peered multicast-enabled network.

FIG. 8 is a flow chart showing construction of a multicast tree.

FIGS. 9A and 9B illustrate exemplary router configurations that can be used in the present techniques.

FIG. 10 illustrates an exemplary switch configuration that can be used in the present techniques.

FIG. 11 illustrates delivery of streaming data.

DETAILED DESCRIPTION OF THE PREFERRED EMBODIMENTS

FIG. 3 illustrates a system that allows multicast media transmissions to be provided from a content aggregation and distribution network 34 to one or more directly peered public or private networks 32A, 32B, 32C, through one or more multicast-enabled network access facilities 36. The content aggregation and distribution network 34 serves as a source of multicast media, and the public or private networks 32A, 32B, 32C serve as destination networks that can request and receive multicast media. In this context, "direct peering" refers to a direct, point-to-point interconnection between one or more networks.

The content aggregation and distribution network 34 can have multiple host computers, servers and databases for gathering and distributing various types of information including data streams. For example, the content aggregation and distribution network 34 typically obtains video, audio and animation programs that then are compressed, encoded and stored in a database. Such programs may include, for example, sports programs, talk and music radio programs, television programs, full-length CDs, news programs, audio books, and conferences, among others. An example of an aggregation and distribution network 34 includes Yahoo. The content aggregation and distribution network 34 can be coupled to the network access facility 36 by another network 38 such as an Ethernet network or a wide area network (WAN). Wide area network (WAN) interconnections 40, for example, can connect the network access facility 36 to the various public and private networks 32A, 32B, 32C. The content aggregation and distribution network 34 also can be connected to a non-multicast-enabled network such as the Internet 42.

The network access facility 36 acts as a peering point, in other words, a network traffic exchange facility through which disparate, independent networks can exchange Internet protocol (IP) multicast data streams. It provides a single point to which a stream data provider can be linked to assure delivery of digital streaming media to all destinations requesting receipt of a multicast transmission.

FIG. 4 illustrates various hardware components of an exemplary network access facility 36. Communication links 54 associated, for example, with long-haul fiber-optic providers connect the network access facility 36 either to another network access facility or to the content aggregation and distribution network 34 via either direct interconnections or virtual private network (VPN) connections. The network access facility 36 includes various networking equipment, including multiplexers 44 to which the communication links 45 are coupled. The networking equipment in the network access facility 36 also includes multiple gateways, such as switches 46 and routers 48. Additionally, the networking equipment includes multiple channel service and data service units (CSU/DSUs) 50. The CSU/DSUs translate information from a circuit switching format to a data switching format. T1/DS-3 communication links 52 can provide the connections from the CSU/DSUs 50 and the routers 48 to the WANs 40. Switches 49 connect together various components of the networking equipment in the network access facility 36.

The network access facility 36 is configured to pass multicast traffic directly from a multicast source, for example, a server 54 (FIG. 5) in the content aggregation and distribution network 34, to one or more destination terminals 56A, 56B, 56C, 56D, 56E. The terminals 56A through 56E may reside in one or more disparate networks, such as the networks 32A, 32B, 32C. As illustrated in FIG. 5, the multicast transmission does not require a separate dedicated feed for each user who requests the multicast data stream. Rather, all users who request the multicast transmission can receive the data stream from a single feed 58.

FIGS. 6 and 7 illustrate how a multicast data stream is provided to the user of a computer terminal, such as the client computer terminal 56A, located in a directly peered multicast-enabled network, such as the network 32A. As illustrated in FIG. 6, the network access facility 36 includes multiple multicast-enabled gateways such as routers or switches 60A through 60L. To request a video, audio or other data stream, the user of the terminal 56A clicks on a hyperlink appearing on a display associated with the terminal (block 100). The user typically would use a computer mouse or other input device to click on the link. If the terminal 56A is multicast-enabled, then a multicast "player," in other words, a multicast software program installed in and associated with the terminal, attempts to join a multicast group (block 102). In this context, a multicast group refers to a virtual destination network address, such as an address in the IP protocol, that is actively received and/or distributed, by one or more multicast-enabled gateways, such as routers or switches, based on user requests. A multicast "tree" then is constructed (block 104). In other words, a group of gateways that connect the requesting terminal 56A to the multicast source 54 and which collectively constitute the path over which the requested media will be sent is established. The requested data stream is sent from the source 54 to the destination terminal 56A through the gateways in the multicast tree (block 106).

FIG. 8 explains further details of how a multicast tree is constructed. When the terminal 56A attempts to join a multicast group that is actively broadcasting the requested transmission, the player associated with the terminal sends a request to a router to which it is connected, for example, the router 60A (FIG. 6). A determination is made as to whether the router 60A is multicast-enabled (block 110). If the router 60A is not multicast-enabled, then the request to receive the multicast transmission fails (block 112). If, however, the router is multicast-enabled, then a determination is made as to whether the router 60A is a member of the multicast group that is actively receiving the requested transmission (block 114). Each router maintains a look-up table in memory indicating whether it is a member of a particular multicast group and on which ports it transmits and receives a particular multicast feed.

For the purpose of illustration, it will be assumed that the routers 60H, 60I, 60J, 60K, 60L, 60M and 60N are members of the multicast group. The remaining routers 60A through 60G initially are not members of the multicast group. Therefore, when the router 60A receives the request from the player at the terminal 56A, it transmits a request to join the multicast group (block 116). The request to join the multicast group is sent to a subsequent upstream gateway in the path toward the multicast source 54, for example, the router 60B.

Blocks 110, 114 and 116 are repeated until the routers providing a path back to the requesting terminal 56A are joined to the multicast group actively receiving the requested transmission. Therefore, with respect to the configuration shown in FIG. 6, blocks 110, 114 and 116 would be repeated for router 60B which sends a request to join the multicast group, for example, to the router 60E. Next, blocks 110, 114 and 116 are performed for the router 60E, which sends a request to join the multicast group, for example, to the router 60J. Router 60J already is a member of the multicast group actively receiving the requested transmission from the server 54 via the router 60M. At this point the downstream routers 60A, 60B and 60E which were not previously members of the multicast group can join the multicast group (block 118), thereby establishing a multicast tree connecting the multicast server 54 to the requesting terminal 56A. The requested data stream is automatically transmitted to the destination terminal 56A via the routers 60M, 60J, 60E, 60B and 60A (block 120). Other terminals in the same or different network also may be receiving the same data stream from the same multicast feed.

If there is no previously-existing multicast group to which the terminal 56A can be coupled to receive the requested transmission, then blocks 110, 114 and 116 are repeated for each router along the path to the source 54 until either the root (or rendevous point (RP)) of the multicast tree is reached or until the router that connects to the source is reached. Once one of the foregoing points is reached, the multicast tree connecting the source to the requesting terminal 56A is established so that the requested data stream can be multicast to the requesting terminal 56A.

FIGS. 9A and 9B illustrate exemplary configurations of routers that can be used in the techniques described here. In particular, FIG. 9A indicates a configuration for a router using a CISCO operating system in a dense mode multicast mode, and FIG. 9B indicates a configuration for a router using a CISCO operating system in a sparse mode multicast mode. FIG. 10 illustrates an exemplary configuration of a switch that can be used in the techniques described here using a CISCO Catylist 5000 operating system.

As illustrated by FIG. 11, the digital media aggregation and distribution network access facility described above is designed to deliver streaming data to mass audiences. Unlike the Multicast Backbone which uses a virtual network layered on the Internet to support routing of IP multicast packets, direct peering provides a physical multicast-enabled network access facility that permits the distribution of multicast media across separate, independent networks. Such direct peering of multicast media can be scaled to accommodate large numbers of users. As also indicated by FIG. 11, the distribution network can continue to transmit unicast data to non-multicast-enabled network destinations. Such unicast transmissions can be sent using transient telecommunication providers such as UUNet, Sprint, MCI, GTE and AT&T.

In general, various components of the system can be implemented in digital electronic circuitry, or in computer hardware, firmware, software, or in combinations of them. The invention can be partially implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired. In any case, the language may be a compiled or interpreted language. Suitable processors include, for example, both general and special purpose microprocessors.

By using direct interconnections between different networks to establish a route for multicast traffic flow, the foregoing techniques can reduce the overall bandwidth required by the end networks and can increase the overall quality of the transmission.

Other implementations are within the scope of the following claims.

What is claimed is:

1. A method of adding a destination node to a multicast network including one or more member nodes, the multicast network including a source node as a first member node, comprising the steps of:

creating a new path to connect the destination node to one member node in the multicast network;

adding each node on the new path to the multicast network; and labeling each node on the new path as a member node of the multicast network.

2. The method of claim 1 wherein the step of labeling includes the step of labeling a given node on the new path as a member node of the multicast network when the given node is not already a member node of the multicast network.

3. The method of claim 2 wherein the step of labeling the given node includes the step of updating a look-up table stored in a memory of the given node.

4. The method of claim 3 wherein the step of updating includes the step of updating the look-up table by specifying ingress and egress ports for supporting the multicast network and by identifying the given node as a member node of the multicast network.

5. The method of claim 1 wherein the destination node is a multicast-enabled node selected from the group consisting of a multicast-enabled gateway, a multicast-enabled router, and a multicast-enabled switch.

6. The method of claim 1 wherein the step of creating includes the step of creating a new path to connect the destination node to one member node in the multicast network that is already actively receiving streaming data from the source node.

7. A method of connecting a terminal to a multicast network including one or more member nodes, the multicast network including a source node as a first member node, comprising the steps of:

connecting the terminal to a destination node;

adding the destination node to the multicast network if the destination node is not already a member node in the multicast network; and wherein the step of adding includes,
creating a new path to connect the destination node to one member node in the multicast network,
adding each node on the new path to the multicast network, and
labeling each node on the new path as a member node of the multicast network.

8. The method of claim 7 wherein the step of labeling includes the step of labeling a given node on the new path as a member node of the multicast network when the given node is not already a member node of the multicast network.

9. The method of claim 8 wherein the step of labeling the given node includes the step of updating a look-up table stored in a memory of the given node.

10. The method of claim 9 wherein the step of updating includes the step of updating the look-up table by specifying ingress and egress ports for supporting the multicast network and by identifying the given node as a member node of the multicast network.

11. The method of claim 7 wherein the destination node is a multicast-enabled node selected from the group consisting of a multicast-enabled gateway, a multicast-enabled router, and a multicast-enabled switch.

12. The method of claim 7 wherein the step of creating includes the step of creating a new path to connect the destination node to one member node in the multicast network that is already actively receiving streaming data from the source node.

13. A method of delivering a requested multicast data stream, the method comprising:

establishing a multicast tree using a plurality of multicast-enabled gateways from a first multicast-enabled network serving as a source of time-based streaming media to a terminal in a directly peered second multicast-enabled network; and multicasting the requested streaming data to the terminal in the directly peered second multicast-enabled network through the tree of multicast-enabled gateways.

14. The method of claim 13 further including:

receiving a request for receipt of the streaming data from the terminal in the second multicast-enabled network.

15. The method of claim 14 including:

constructing the multicast tree in response to the request to receive the streaming data.

16. The method of claim 15 wherein construction of the multicast tree starts from a gateway at an upstream end of the path near the terminal and moves toward the second multicast-enabled network.

17. The method of claim 13 including sending a request from one of the plurality of multicast-enabled gateways to another one of the multicast-enabled gateways to join a group of gateways already actively receiving the requested streaming data.

18. A multicast media system comprising:

a first multicast-enabled network including a source of time-based data streams;

a second multicast-enabled network; and a network access facility that directly interconnects the second multicast-enabled network to the first multicast-enabled network without using a server that works as a proxy for a group security controller, and that is configured to multicast a time-based data stream from the first multicast-enabled network to at least one terminal in the second multicast-enabled network that requests receipt of the data stream.

19. The system of claim 18 wherein the network access facility includes a plurality of multicast-enabled gateways configured to establish a path over which the requested data stream will be sent to the terminal in the second multicast-enabled network.

20. The system of claim 19 wherein the plurality of multicast-enabled gateways include routers.

21. The system of claim 19 wherein the plurality of multicast-enabled gateways include switches.

22. The system of claim 18 wherein the first multicast-enabled network is a multimedia aggregation and distribution network.

23. The system of claim 22 wherein the requested multicast data stream includes video, audio or both.

24. A multicast media system comprising:

a network access facility that directly interconnects a first multicast-enabled network to one or more other multicast-enabled networks, and that is configured to multicast a requested time-based data stream from the first multicast-enabled network to another multicast-enabled network that requests the time-based data stream, and to construct a multicast tree representative of multicast-enabled gateways to establish a path over which the requested time-based data stream will be sent to the terminal in the other multicast-enabled network; and wherein the network access facility is configured to construct the multicast tree directly without using a server that works as a proxy for a group security controller.

25. The system of claim 24 wherein the network access facility is configured to construct the multicast tree in response to a request by a user at the terminal to receive the time-based data stream.

26. The system of claim 24 wherein the network access facility is configured to construct the multicast tree by starting from a gateway at an upstream end of the path near the terminal and moving toward the other multicast-enabled network.

27. The system of claim 24 wherein the network access facility includes a plurality of gateways that collectively form the multicast tree, and wherein, during construction of the multicast tree, at least some of the gateways attempt to join a group of gateways already actively receiving the requested time-based data stream.

28. A method of providing a time-based transmission from a first multicast-enabled network to a second multicast-enabled network, the method comprising:

establishing a multicast-enabled network access facility between the first and second multicast networks, wherein the network access facility provides direct peering between the first and second multicast-enabled networks, and wherein the network access facility is configured to multicast a requested time-based data stream from the first multicast-enabled network to a terminal in the second multicast-enabled network that requests receipt of the multicast data stream.

29. A method of creating a multicast network comprising the steps of:

providing a multicast source node;

providing a first destination node;

creating a first path to connect the first destination node to the multicast source node;

adding each node on the first path to the multicast network;

labeling each node on the first path as a member node of the multicast network;

providing a second destination node;

creating a second path to connect the second destination node to one member node of the multicast network;

adding each node on the second path to the multicast network;

labeling each node on the second path as a member node of the multicast network;

providing a third destination node;

creating a third path to connect the third destination node to one member node of the multicast network;

adding each node on the third path to the multicast network; and labeling each node on the third path as a member node of the multicast network.

\* \* \* \* \*

UNITED STATES PATENT AND TRADEMARK OFFICE
CERTIFICATE OF CORRECTION

PATENT NO.   : 6,523,069 B1
DATED        : February 18, 2003
INVENTOR(S)  : Edward A. Luczycki and Darin D. Divinia It is certified that error appears in the above-identified patent and that said Letters Patent is hereby corrected as shown below:

<u>Title page,</u>
Item [57] ABSTRACT,
Line 7, amend "request" to -- requests --.

Signed and Sealed this

Sixteenth Day of September, 2003

JAMES E. ROGAN
*Director of the United States Patent and Trademark Office*